United States Patent
De Rijcke et al.

(10) Patent No.: US 10,715,066 B2
(45) Date of Patent: Jul. 14, 2020

(54) METHOD FOR CONTROLLING A WIND TURBINE

(71) Applicant: Nordex Energy GmbH, Hamburg (DE)

(72) Inventors: Simon De Rijcke, Hamburg (DE);
Niels Hamann, Hamburg (DE);
Christian Wessels, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 34 days.

(21) Appl. No.: 16/104,536

(22) Filed: Aug. 17, 2018

(65) Prior Publication Data
US 2019/0058425 A1 Feb. 21, 2019

(30) Foreign Application Priority Data
Aug. 18, 2017 (EP) ..................................... 17186837

(51) Int. Cl.
*H02P 9/00* (2006.01)
*F03D 7/02* (2006.01)
(Continued)

(52) U.S. Cl.
CPC ............ *H02P 9/008* (2013.01); *F03D 7/0272* (2013.01); *F03D 7/0284* (2013.01); *F03D 9/255* (2017.02);
(Continued)

(58) Field of Classification Search
CPC .. H02P 9/008; H02P 9/007; H02P 9/02; H02P 2101/15; F03D 9/255;
(Continued)

(56) References Cited

U.S. PATENT DOCUMENTS 6,600,240 B2 * 7/2003 Mikhail ................ F03D 7/0224
307/85
8,046,110 B2 * 10/2011 Mayor ................. F03D 7/0284
290/44
(Continued)

FOREIGN PATENT DOCUMENTS

DE 102009014012 A1 9/2010
DE 102012224067 A1 6/2014
(Continued)

*Primary Examiner* — Tulsidas C Patel
*Assistant Examiner* — Joseph Ortega
(74) *Attorney, Agent, or Firm* — Barclay Damon LLP

(57) ABSTRACT

A method for controlling a wind turbine comprising inputting an actual value of rotational speed and a rotational speed setpoint into a control and outputting a set point value for a generator torque from the control. Inputting the set point value for the generator torque into a limiter with a predefinable upper and lower limit and outputting a limited torque value that is fed into a converter control. Increasing the actual value of the fed-in electrical power by an additional amount of power in response to a boost signal, wherein the fed-in electrical power and the additional amount of power are combined into an aggregated power setpoint value. Determining the set point value for the generator torque from the aggregated power setpoint value and applying the set point value for the generator torque in the boost operation to the limiter both as the upper limit and as the lower limit.

17 Claims, 11 Drawing Sheets

(51) Int. Cl.
*F03D 9/25* (2016.01)
*H02P 9/02* (2006.01)
*H02J 3/38* (2006.01)
*H02P 101/15* (2016.01)

(52) U.S. Cl.
CPC .............. *H02J 3/386* (2013.01); *H02P 9/007* (2013.01); *H02P 9/02* (2013.01); *F05B 2220/70646* (2013.01); *F05B 2270/1032* (2013.01); *F05B 2270/327* (2013.01); *F05B 2270/335* (2013.01); *F05B 2270/337* (2013.01); *H02P 2101/15* (2015.01)

(58) Field of Classification Search
CPC ...... F03D 7/0272; F03D 7/0284; H02J 3/386; F05B 2220/70646; F05B 2270/1032; F05B 2270/327; F05B 2270/335; F05B 2270/337
See application file for complete search history.

(56) References Cited

U.S. PATENT DOCUMENTS

| | | | |
|---|---|---|---|
| 8,346,400 B2* | 1/2013 | Gonzalez Senosiain | ............... G05F 1/67 290/44 |
| 8,618,685 B2* | 12/2013 | Drossel | ............... F03D 7/0284 290/44 |
| 9,709,037 B2* | 7/2017 | Sagi | ............... F03D 9/11 |
| 10,393,092 B2* | 8/2019 | Drossel | ............... H02J 3/46 |
| 2007/0047163 A1* | 3/2007 | Lutze | ............... F03D 7/0284 361/78 |
| 2008/0265846 A1* | 10/2008 | Laubrock | ............... F03D 7/0272 322/29 |
| 2010/0124498 A1* | 5/2010 | Kabatzke | ............... F03D 7/047 416/61 |
| 2012/0205912 A1* | 8/2012 | Wakasa | ............... F03D 7/0284 290/44 |
| 2012/0310426 A1* | 12/2012 | Tarnowski | ............... F03D 7/0272 700/287 |
| 2012/0313593 A1* | 12/2012 | Knuppel | ............... F03D 7/0284 323/234 |
| 2015/0159626 A1* | 6/2015 | Tarnowski | ............... F03D 7/04 290/44 |
| 2015/0333501 A1 | 11/2015 | Geisler et al. | |
| 2015/0381089 A1* | 12/2015 | Tarnowski | ............... H02J 3/24 307/84 |
| 2017/0009740 A1* | 1/2017 | Geisler | ............... H02J 3/386 |
| 2019/0024634 A1* | 1/2019 | Tarnowski | ............... G05B 15/02 |

FOREIGN PATENT DOCUMENTS

| | | |
|---|---|---|
| DE | 102015208554 A1 | 11/2016 |
| EP | 2532888 A1 | 12/2012 |

* cited by examiner

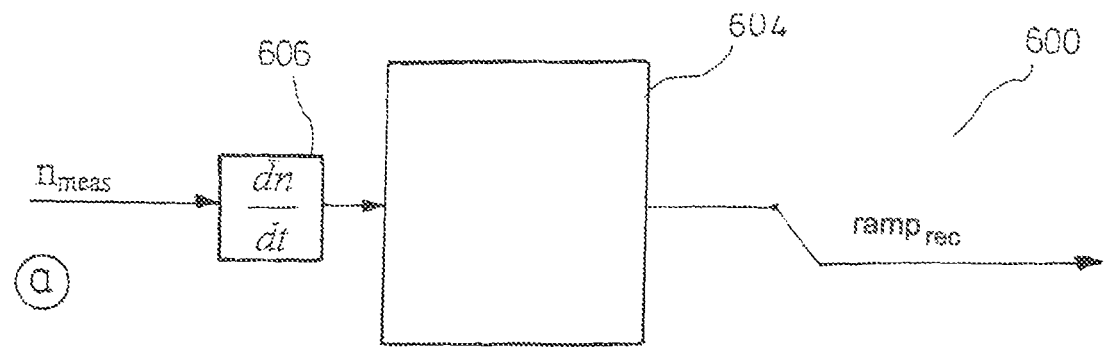
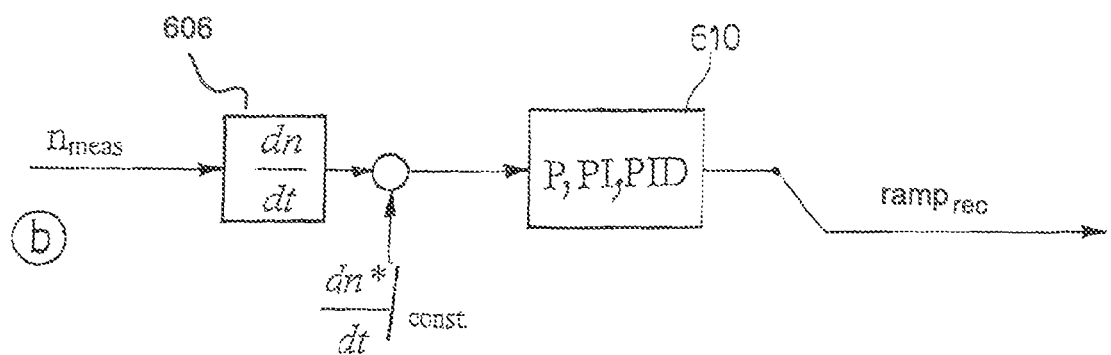
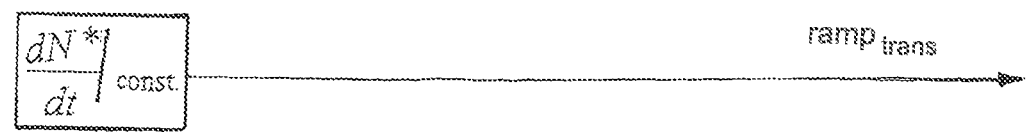
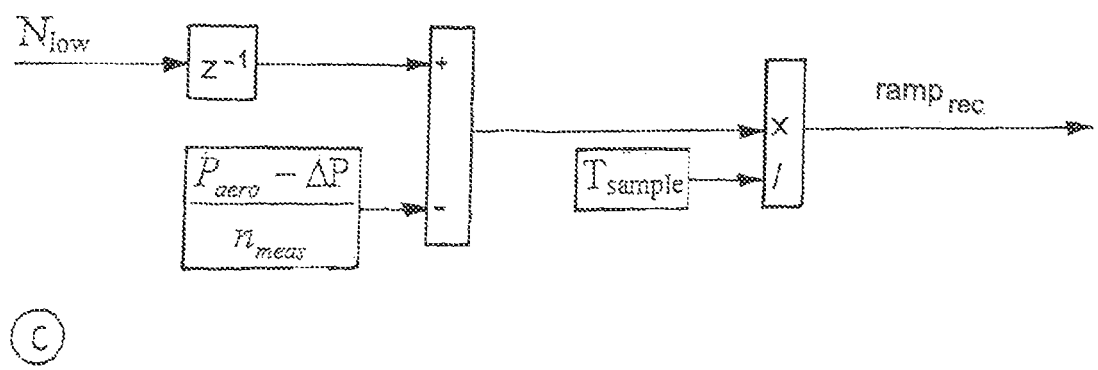
FIG.7a-c

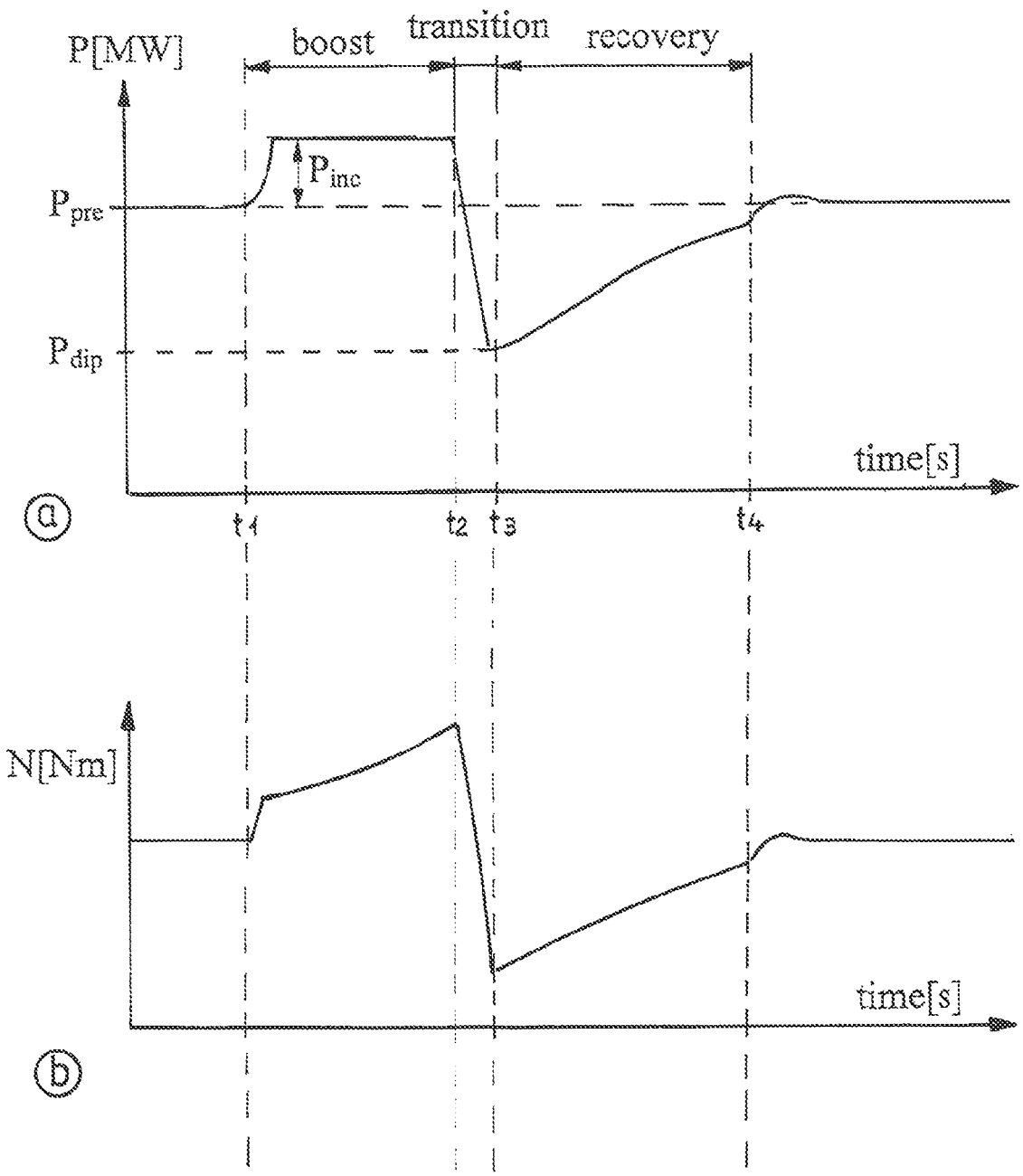
FIG.8 (a,b)

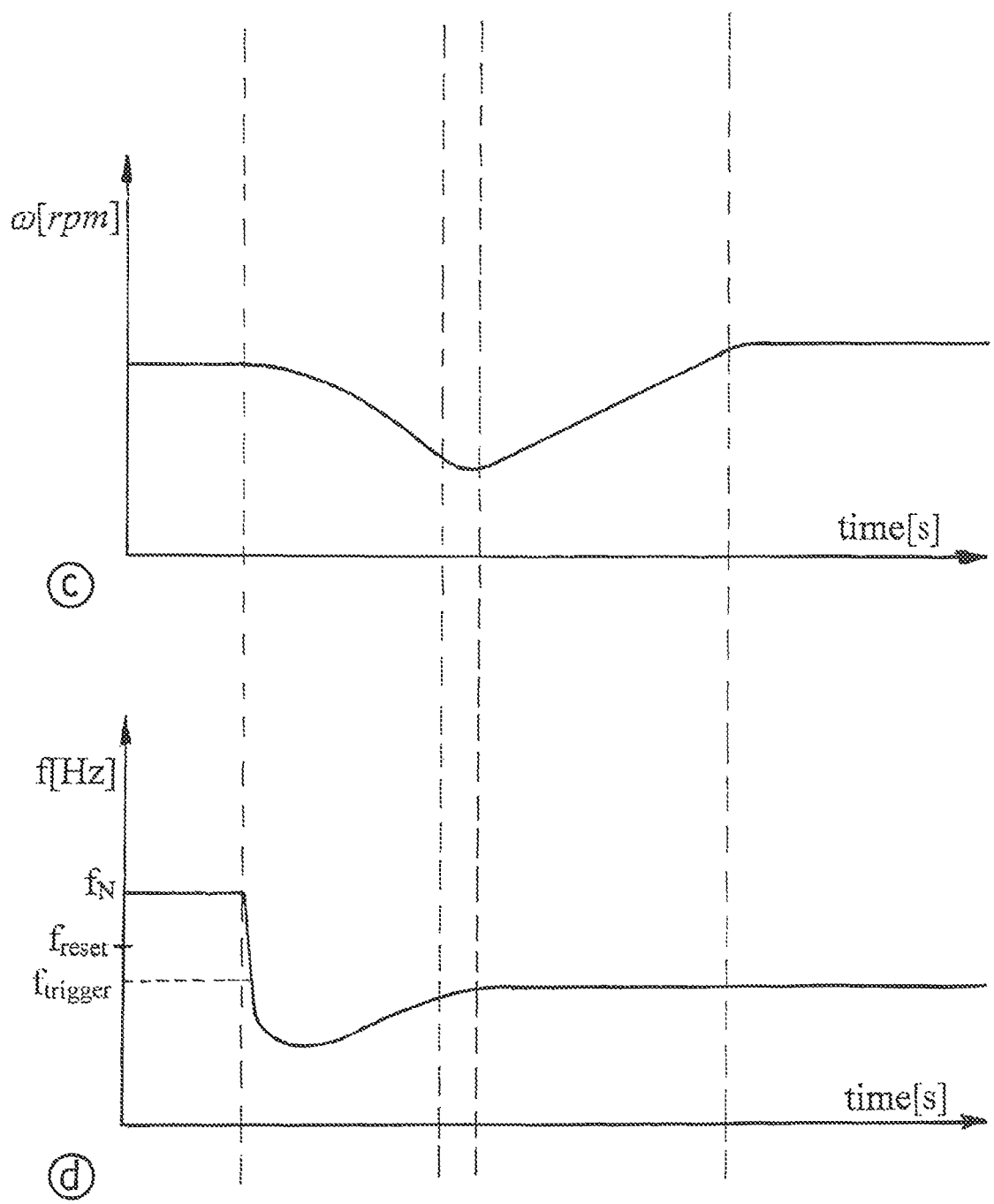
FIG. 8 (c,d)

METHOD FOR CONTROLLING A WIND TURBINE

CROSS REFERENCE TO RELATED INVENTION

This application is based upon and claims priority to, under relevant sections of 35 U.S.C. § 119, European Patent Application No. 17 186 837.5, filed Aug. 18, 2017, the entire contents of which are hereby incorporated by reference.

BACKGROUND

The present invention relates to a method for controlling a wind turbine in which electrical power fed into an electrical transmission network is increased in boost operation via a generative deceleration of the generator.

The present invention relates to the control of a wind turbine for a mode of operation referred to as "virtual inertia." For the purpose of grid support, an excessive amount of power, in particular effective power, is hereby fed into the electrical transmission network at short notice. For this purpose, the wind turbine emulates an underfrequency response of conventional synchronous generators. From the perspective of the energy balance, for feeding in the excessive power value, the rotational energy stored in the rotating mass of the wind turbine is converted at short notice and for a short time into electrical power via the generator and fed into the electrical transmission network. This process leads to more electrical power being fed into the transmission network in boost operation than is converted and can be converted from the wind at short notice in the form of mechanical power. This leads to a decrease of the rotational speed and, linked therewith, of the stored rotational energy. At the end of the boost phase, the wind turbine is at an operating point with regard to rotational speed and torque that is not suitable for continuous operation. In a recovery phase, the wind turbine is then transferred to an operating point at which the rotational speed and torque are at a predetermined ratio that is optimal for taking up power from the wind and at which the wind turbine can be operated continuously. The method and procedure for virtual inertia are difficult to perform from a control engineering perspective.

A control arrangement for virtual inertia operation on a wind turbine is known from EP 2 532 888 A1, in which a two-state control (bang-bang control) is used to control the power generation while providing a power boost operation control.

BRIEF SUMMARY OF THE INVENTION

The object of the present invention is to provide a method for operating a wind turbine that, with simple means, enables reliable control of the operation during and after a provision of increased electrical power.

A method of controlling a wind turbine is provided in particular for boost operation in which electrical power fed into an electrical transmission network is increased via a generative deceleration of the generator. In boost operation, excessive power that stems from a generative deceleration of the wind turbine is fed into the electrical transmission network. The generative deceleration causes the rotational energy stored in the rotating parts to be converted into electrical power. The operating method provides that a set point value for a generator torque is determined depending on an actual value of a rotational speed. This is thus a rotational speed-dependent torque control. In the method, the determined set point value for the generator torque is applied to a converter and its dedicated converter control via a limiter with a predefinable upper and lower limit. In regular operation, the limiter is provided for the set point value of the generator torque to prevent that set point values for the generator torque that are too large or too small are actuated by the converter. If a boost signal occurs in the method according to the invention, an increased electrical power is fed into the transmission network in boost operation. A boost signal does not necessarily have to be present in the form of a flag bit, it can also consist in the checking of triggering conditions for a boost operation. The electrical power that is fed in is increased in relation to an actual value of the electrical power fed in before the boost signal. Increased electrical power that is fed in can also be greater than the rated power value of the wind turbine. For increased feeding in of power, a set point value for the generator torque in boost operation is determined which leads to the increased feeding in of power. According to the invention, the calculated set point value for the generator torque in boost operation is applied to the limiter both as the upper limit and as the lower limit. The particular advantage of this method step is that, even in the case virtual inertia is provided and the associated boost operation is active, a rotational speed/torque control can continue to work similarly to normal operation. An already existing limiter can also be used. Likewise, an already existing rotational speed/torque control does not have to be modified. In boost operation, the limiter determines the set point value for the generator torque by setting the upper and lower limit of the limiter to the set point value. Another particular advantage of the method according to the invention can be seen in that the switching to and from normal operation must take place with continuous, rotational speed-dependent calculation of the set point value for the generator torque, which is possible by adjusting the upper and lower limit for the limiter.

In an embodiment, the boost signal is generated when the frequency in the electrical transmission network falls below a first predetermined frequency value. The frequency-dependent switching into boost operation is preferably a response to an underfrequency. Depending on the implementation of the method according to the invention at the level of the individual wind turbine or at the level of a wind farm, the frequency measurement can also take place either directly at the wind turbine or at the level of the farm, for example in the wind farm collector bus or at the feed-in point.

In an embodiment which can be alternatively or additionally provided, the boost signal is generated when a temporal change of the frequency in the electrical transmission network exceeds a predetermined gradient value. The boost signal is generated when the frequency gradient exceeds a predetermined limit. The frequency gradient is defined as a change in frequency $\Delta f$ during a period of time $\Delta t$. Such a gradient-dependent triggering process allows a faster boost activation, in response to a drop in frequency compared to a triggering threshold that only takes into account a frequency value. If a triggering threshold is set to respond to a value that the frequency must fall below, the response of the wind turbine is delayed, since there is a wait until the frequency value falls below the threshold, even when it can be foreseen due to the rate of change that the corresponding threshold value will soon be reached.

In a further embodiment of the method, a plurality of different gradient values can also be provided. Here, the different gradient values $\Delta f/\Delta t$ are measured for different periods of time Δt. For example, they can be measured over a longer period of time Δtlong or a shorter period of time Δtshort. The gradient values that relate to a shorter period of time can be used to react more quickly to a change in frequency, whereas gradient values that relate to a longer period of time are reacted to differently, in particular with less urgency.

In an embodiment, the boost signal is reset when either a predetermined period of time $T_{boost}$ has elapsed since the boost signal occurred or the actual value of the frequency in the electrical transmission network is greater than a second predetermined frequency value, which is in turn greater than the first predetermined frequency value. Boost operation with the feeding in of increased electrical power is maintained at the most for a predetermined period of time. The period of time is, for example, dependent on the type and design of the wind turbine and can also consider guidelines of a grid code. If the frequency in the electrical transmission network already returns during this time and exceeds the second predetermined frequency value, boost operation can be terminated early by resetting the boost signal.

The operating state of the excessive power feeding continues as long as the boost signal is set. It is only switched into another operating state when the boost signal is reset. Resetting the boost signal does not necessarily comprise canceling a signal or deleting a flag bit, but can also be characterized generally as the termination of a first operating phase of boost operation. In addition to the return of the frequency in the electrical transmission network, conditions for an early termination of boost operation can also be defined such as, for example, lower limits for rotational speed and fed-in power.

In an embodiment, the set point value for the generator torque is calculated during boost operation from an electrical power when the boost signal occurs and a boost power, depending on the actual value of the rotational speed. In the calculation, using the power when the boost signal occurs as the basis, the boost power is added and a value proportional to the generator torque is calculated by dividing by the actual value of the rotational speed. The particular advantage of this method is that it takes into account the current value of the rotational speed and thus a control of the wind turbine also takes place during boost operation.

In an embodiment, the value for the boost power is also a predetermined fraction of the rated power or the power when the boost signal occurs. If the power when the boost signal occurs is taken into account, the value for the boost power in a wind turbine that feeds in a lot of power when the boost signal occurs is greater than in a wind turbine that feeds in a small amount of power when the boost signal occurs. The power can also be averaged over a predetermined period of time when the boost signal occurs.

It is also possible to determine the value for the boost power depending on the measured frequency. Such a frequency dependency allows the boost power to be influenced by the grid frequency.

In addition to the dependency of the boost power on the grid frequency, it is also possible to take into account the change in frequency per time, i.e., the gradient value in the electrical transmission network, for the boost power. Here, a form of proportionality can be assumed. Accordingly, a large gradient value, i.e., a strong drop in frequency in a short time, leads to a larger boost power than a small gradient value. It is also possible to reduce the boost power when the frequency reaches a stationary state.

In an embodiment of the method, either a transition operation or a recovery operation follows boost operation after the boost signal has been reset. Both the transition operation, which is characterized by a transition signal, and the recovery operation, which is characterized by a recovery signal, serve for returning the wind turbine, after completed boost operation, to a stable operating state for a rotational speed-dependent torque control. At the end of boost operation, the turbine is in a state in which the rotational speed is too low for the set point value of the generator torque so that the rotational speed is raised in transition operation and in recovery operation and the fed-in power is lowered.

In an embodiment, the upper and lower limit at the limiter are set when the boost signal is reset, i.e., when the transition signal or the recovery signal is generated, to predetermined values for a normal operation of the wind turbine, and the temporal change of the set point value for the generator torque is controlled via a ramp function. In contrast to boost operation, the set point value of the generator torque is not determined via the correspondingly set limits on the limiter, but the temporal change of the set point value for the generator torque is controlled via a ramp function, in particular the temporal change of the lower and upper limit of the generator torque is controlled. The control via the ramp function causes the maximum permissible change of the set point value for the generator torque to be limited. Similarly to boost operation, the limiting of the generator torque also takes place in transition or recovery operation via the limiter for the generator torque, wherein the maximum permissible rate of change of the generator torque is controlled via the limiter until the conclusion of transition or recovery operation.

In an embodiment, the wind turbine switches to recovery operation after boost operation and determines the maximum permissible temporal change of the set point value for the generator torque, depending on the temporal change of the rotational speed. The temporal change of the rotational speed, in particular an increasing rotational speed, is an indication that the wind turbine is again approaching a stationary operating state.

In another embodiment, a switch to recovery operation takes place after boost operation. In recovery operation, the maximum permissible temporal change of the set point value for the generator torque is dependent on the temporal change of the rotational speed. The temporal change of the rotational speed is composed of the temporal change of the actual value of the rotational speed and a constant value added hereto. The temporal change of the rotational speed is applied to a control in order to determine a set point value for the generator torque. Here, a control with a P element or a PI element or a PID control can be provided as the control. When using a control with a P element or PI element, it is advantageous that strong variations of the set point value are suppressed by the omission of a D component to prevent the drive train with its drive train elements such as a shaft or a coupling from experiencing excessive loads.

The parameters of the P element and/or the PI element can be parameterized depending on an operating state and/or type of the wind turbine, wherein the effort for the parameterization can be reduced using adaptive gain scheduling.

In an alternative embodiment, a transition zone is provided temporally between boost operation and recovery operation. In the transition zone, a maximum permissible temporal change of the set point value for the generator torque is set to a constant value. This means that the maximum permissible temporal change is constant. In this manner, the set point value for the generator torque is adjusted with a consistent rate of change.

In a further embodiment, the transition signal is reset and the recovery signal is set when the actual value of the rotational speed increases and/or the fed-in power is smaller than the available power. The increase in the actual value of the rotational speed means that the rotational speed rises and the wind turbine therefore returns, after boost operation, to an operation in which the rotational speed and fed-in power correspond to each other. Considering the fed-in power in relation to the available power means that the fed-in electrical power is smaller than the power available from the wind at this rotational speed. This approach ensures that, over time, power that is not fed in is stored again in the wind turbine as rotational energy.

In an embodiment, the maximum temporal change of the set point value of the generator torque in recovery operation is determined depending on the actual value of the rotational speed and the available power. Preferably, the available power is hereby determined based on the current rotational speed and/or the wind speed.

In an embodiment, the maximum permissible temporal change of the set point value of the generator torque is determined, depending on an actual value of the power that is fed in, when the recovery signal occurs and on the current actual value of the rotational speed. Taking into account the actual value of the fed-in power when the recovery signal occurs allows the wind turbine, after termination of recovery operation, to return to the operating state at an earlier point in time.

In an embodiment, the recovery signal is reset when the set point value of the generator torque lies within a range specified by the upper limit and the lower limit of the limiter, wherein the limiter then has no further effect on the set point value of the generator torque.

Resetting the recovery signal returns the wind turbine to its regular operating mode in which, depending on the rotational speed, a set point value for the generator torque is determined and this set point value is limited via the limiter to a range between the upper and the lower limit.

BRIEF DESCRIPTION OF THE DRAWINGS

A preferred exemplary embodiment of the invention is explained in greater detail below based on the figures. In the figures:

FIG. 7a illustrates an embodiment of a method for operating the wind turbine in transition and/or recovery operation;

FIG. 7b illustrates a second embodiment of a method for operating the wind turbine in transition and/or recovery operation;

FIG. 7c illustrates a third embodiment of a method for operating the wind turbine in transition and/or recovery operation;

FIG. 8a illustrates the qualitative course of effective power in the electrical transmission network over time;

FIG. 8b illustrates the qualitative course of generator torque in the electrical transmission network over time;

FIG. 8c illustrates the qualitative course of rotational speed in the electrical transmission network over time; and FIG. 8d illustrates the qualitative course of grid frequency in the electrical transmission network over time.

DETAILED DESCRIPTION OF THE INVENTION

Figure 1A:
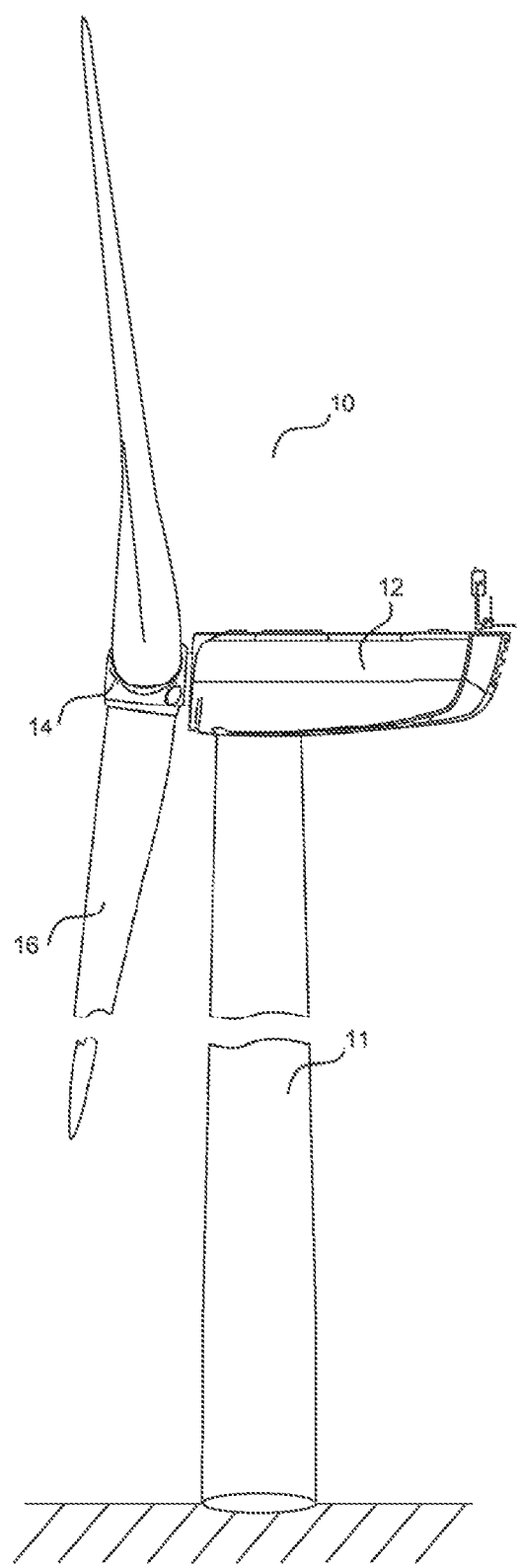
FIG. 1a illustrates a side plan view of an embodiment of a wind turbine.
Figure 1B:
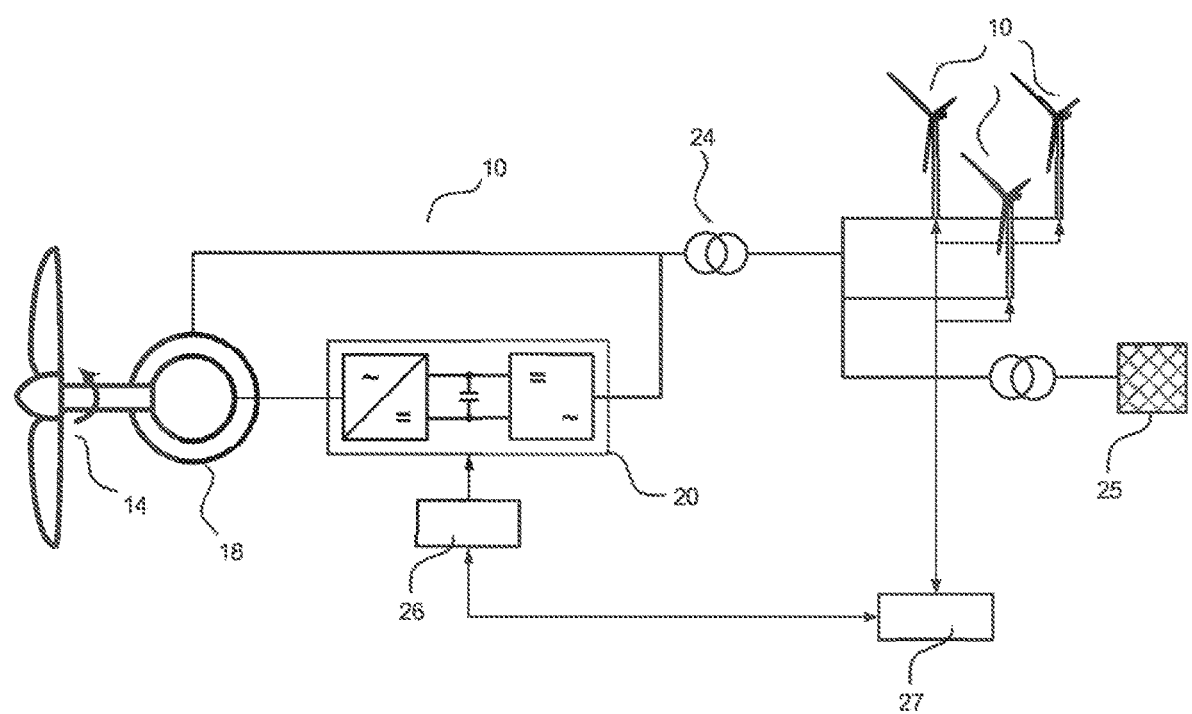
FIG. 1b illustrates a schematic view of an embodiment of a wind turbine feeding into the electrical transmission network.

FIG. 1a shows a schematic view of a wind turbine 10 with a tower 11, a nacelle 12, and a rotor 14. The rotor supports multiple rotor blades 16 that take up power from the wind. FIG. 1b shows an embodiment of a wind turbine 10 with a double-fed Asynchronous generator 18 which is connected to an electrical transmission network 25, on the rotor-side via a converter 20 and on the stator-side directly, i.e., without insertion of a converter. Alternatively, the wind turbine can also be configured with a full-scale converter. Feeding into the electrical transmission network 25 takes place, for example, via a transformer 24. The wind turbine 10 can be part of a wind farm consisting of multiple wind turbines 10 that, for example, are connected to the electrical transmission network 25 via a wind farm collector bus and a high-voltage transformer. The wind turbine 10 has a control 26 that is connected for data communication to the converter 20 or respectively to its control. The control 26 is connected for data communication to a wind farm control 27 that is configured for controlling multiple wind turbines 10. The method according to the invention can preferably be implemented in the control 26. In principle, the invention can also be employed on the level of the wind farm in that set point values are determined for each individual wind turbine 10 by the wind farm control 27 and a frequency is measured at the feed-in point or in the wind farm collector bus.

Figure 2:
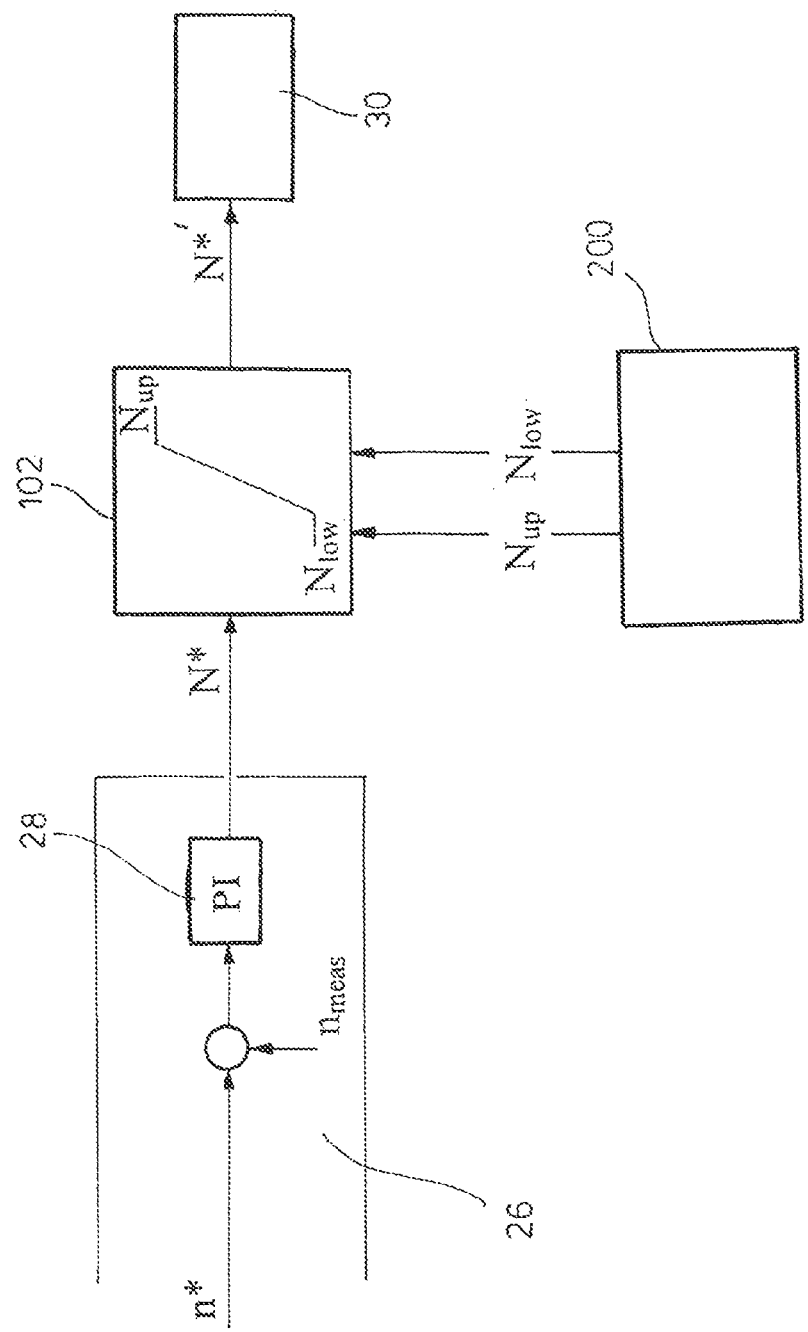
FIG. 2 illustrates a schematic diagram of an embodiment of a torque control of a converter.

FIG. 2 shows a schematic view of a control 26 for the operation of the wind turbine. A torque set point value N* for the converter is determined via a PI control 28 from a control deviation formed using a rotational speed set point value n* and an actual value of the rotational speed $n_{meas}$. The torque set point value N* is applied to a limiter 102. The limiter is a limiter with an adjustable lower and upper limit (dynamic limiter). The lower limit $N_{low}$ and the upper limit $N_{up}$ are determined by a limiter control 200. The limiter control 200 can also be provided with procedures for braking the wind turbine or have data sets for determining the lower and upper limits for other operating modes. In the present case, the situation of virtual inertia and its procedure, in which rotational energy is captured from the rotating part of the wind turbine when the fed-in electrical power is increased, is discussed. The limiter 102 limits the applied torque set point value N* and provides a limited torque set point value N*'. The output value N*' of the limiter 102 is used to control the generator torque of the wind turbine. The control of the generator torque takes place depending on the generator used. In the case of the double-fed induction machine 18 mentioned above, the generator torque is adjusted, for example, by actuating the converter. The generator torque is the electrical generated counter-torque to the mechanical torque of the rotor of the wind turbine that must be applied to the generator in order to generate electrical power. In the example represented in FIG. 2, the set point value for the generator torque N*' is applied to a control of a converter 30.

Virtual inertia operation uses a frequency $f_{meas}$ measured at the connecting terminals of the wind turbine. The measured frequency value $f_{meas}$ represents the actual value and allows a deviation from the rated value of the grid frequency to be detected. In a wind farm with multiple wind turbines that are connected together, a farm control receives the measured frequency and forwards the measured frequency without further processing to all the connected wind turbines or induces a corresponding procedure at the wind turbine. Alternatively, the frequency can also be measured locally for one or multiple turbines, which avoids a delay in operating time and a communication effort in the wind farm.

The frequency measurement is evaluated in the control of the wind turbine in order to trigger the virtual inertia function. When the frequency falls below a triggering frequency $f_{trigger}$ as the first predetermined frequency value, then the virtual inertia function is activated in the limiter control 200. If the virtual inertia function is activated, a corresponding boost signal is set and a series of operating states is run through: a boost operation and a recovery operation and possibly an interposed transition operation. The triggering of boost operation will be described in the following with reference to FIG. 3 and FIG. 4.

Figure 4:
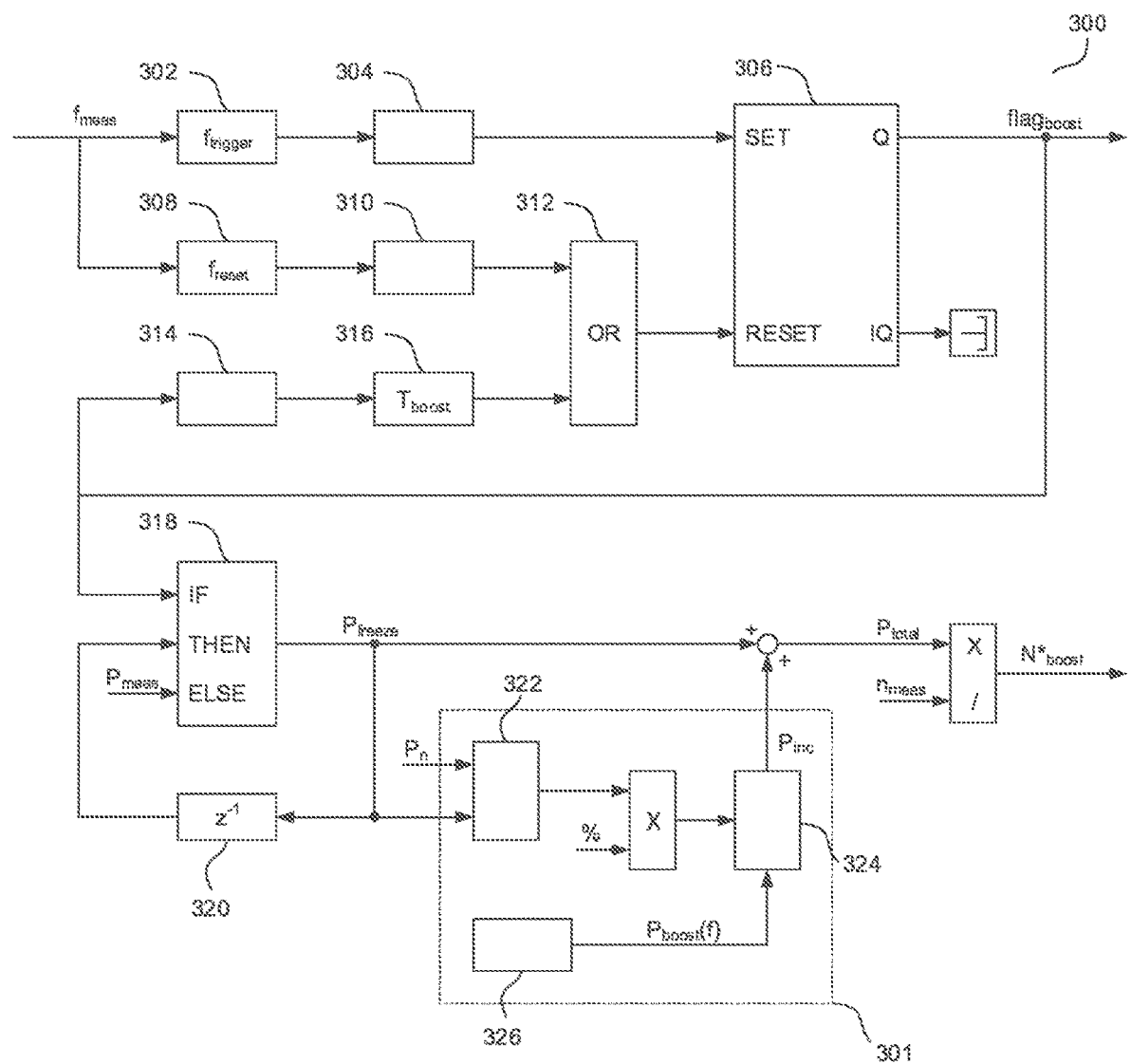
FIG. 4 illustrates a schematic diagram for determining the set point value for the generator torque.

FIG. 4 describes the generation of the boost signal flag$_{boost}$ as well as the set point value for the generator torque N*$_{boost}$. The input variable for the generation of the boost signal flag$_{boost}$ is the actual value of the frequency $f_{meas}$ in the electrical transmission network. The chosen representation shows the boost signal represented as a flag bit, which could also be represented by a state machine or in another manner. In step 302, the actual value of the frequency $f_{meas}$ is compared with a first predetermined frequency value for the triggering frequency $f_{trigger}$. If the actual value is smaller than the first predetermined frequency value, the output of the corresponding recognition circuit 304 is set to 1. The output signal of the recognition circuit 304 is applied to the SET input of a flip-flop 306 so that the boost signal flag$_{boost}$ is output when an underfrequency at its Q output is recognized. If the actual value of the frequency during a comparison 308 is greater than a second predetermined frequency value for a reset frequency $f_{reset}$, this is recognized in the recognition circuit 310 and a corresponding 1 value is applied to the input of the OR circuit 312 by the recognition circuit 310. At the other input of the OR circuit 312, the output of a comparator 316 is applied which outputs a 1 value when the boost signal flag$_{boost}$ is applied to the comparator for a boost period $T_{boost}$. The boost period is detected via a time element 314. Further conditions for the OR circuit 312 are described in the following. The output of the OR circuit 312 is applied to the RESET input of the flip-flop 306 which serves to set the Q output to zero so that the boost signal flag$_{boost}$ is no longer being output.

The boost signal flag$_{boost}$ is applied to an IF-THEN branch 318 insofar as it is generated by the flip-flop 306. When the boost signal flag$_{boost}$ is applied to the IF-THEN branch 318, this outputs a frozen electrical power $P_{freeze}$ at its output. The frozen power $P_{freeze}$ is fed back via a time element 320. With the frozen power $P_{freeze}$, the actual value of the electrical power is frozen before the boost signal occurs and is used as a basis for the control during boost operation. If the boost signal flag$_{boost}$ is not or is no longer applied to the IF-THEN branch 318, the IF-THEN branch 318 is configured to output an applied actual value of the electrical power $P_{meas}$ currently delivered by the wind turbine as an ELSE value.

In an additional block 301, a power $P_{inc}$ to be additionally provided is determined. To determine the power $P_{inc}$, different approaches can be chosen that can be selected with the selection elements 322 and 324. One approach is based on the rated power $P_n$. In an alternative embodiment, the frozen power $P_{freeze}$ can be taken as the basis. Both variables are applied to selection element 322, which is configured, depending on which method is selected, to apply one of the variables to a multiplication element. The multiplication element is equipped to scale the applied power value by a percentage in order to determine the power $P_{inc}$ to be additionally provided. The percentage can be determined by another circuit element (not shown), e.g., depending on the measured grid frequency $f_{meas}$. Alternatively, it is also possible for a calculation element 326 to determine a frequency-dependent power value $P_{boost}(f)$. In the represented exemplary embodiment, a selection element 324 allows the selection of which of the determined power values are output from the block 301 as $P_{inc}$. However, it is also possible to provide only one of the variations and to parameterize the solution preferred for a wind farm project in the software. The frozen power $P_{freeze}$ and the additional power $P_{inc}$ are added up to an aggregated power set point value $P_{total}$ by means of an addition element and are divided by the current actual value of the rotational speed $n_{meas}$ by means of a division element in order to determine the set point value for the generator torque N*$_{boost}$.

In summary, it can be noted regarding the procedure in FIG. 4 that, when the frequency below the frequency value $f_{trigger}$ is detected, a boost signal flag$_{boost}$ is generated for a predefinable boost period $T_{boost}$. By using a second predetermined frequency $f_{reset}$, the boost mode can be exited early when the grid frequency returns to its normal range. Further possible conditions for an early exit of boost operation can be, for example, reaching a minimum generator rotational speed below which the wind turbine cannot be operated continuously. By resetting the boost signal flagboost when the minimum generator rotational speed is reached, a switch-off of the wind turbine as the result of boost operation can be avoided. Likewise, a minimum speed or a maximum rotational speed reduction can be defined for the generator in order to avoid stall operation and shutdown of the wind turbine. For this purpose, corresponding input values can additionally be applied to the OR circuit 312 so that boost operation, when corresponding signals are applied, is terminated early and the boost signal flag$_{boost}$ is reset.

Figure 3:
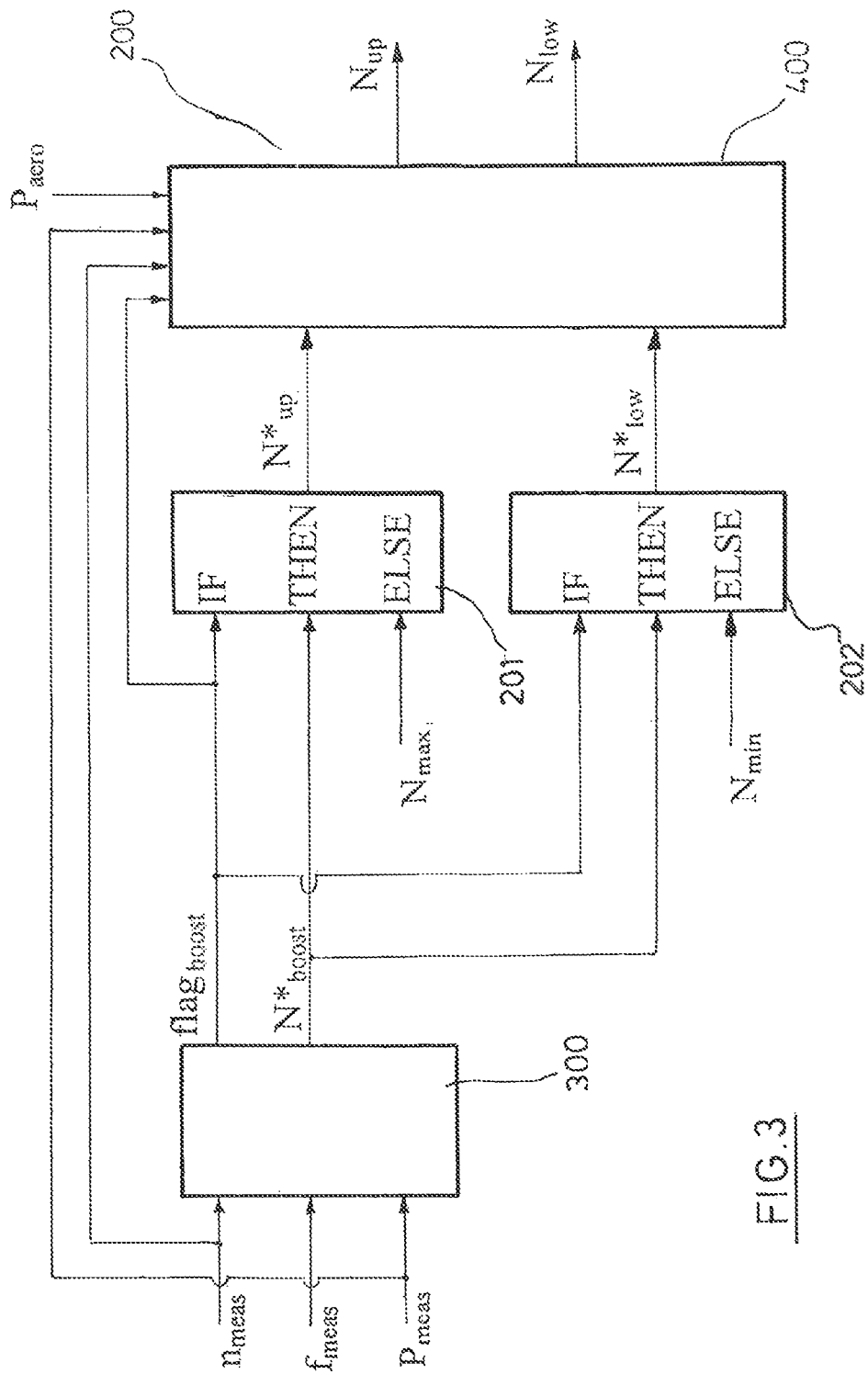
FIG. 3 illustrates a schematic diagram for determining the upper and lower limit for the limiter.

The signals determined according to the exemplary embodiment from FIG. 4 are used, according to the block diagram from FIG. 3, for determining the upper limit $N_{up}$ and the lower limit $N_{low}$ for the limiter 102. FIG. 3 represents the limiter control 200. To determine the upper and lower limit for the limiter 102, the actual value of the rotational speed $n_{meas}$, the actual value of the frequency $f_{meas}$ and the actual value of the fed-in electrical power $P_{meas}$ are applied to the block 300 in FIG. 3. The block 300 possesses the design explained with reference to FIG. 4. The output variables from block 300 are the boost signal flag$_{boost}$ and the set point value for the torque N*$_{boost}$ in boost operation. The two signals are each applied to an IF-THEN branch 201 or 202, respectively, and are checked by the branches against the IF condition. In addition, the values for the maximum torque $N_{max}$ or respectively the minimum torque $N_{min}$ provided for normal operation is applied to the branch 201 or respectively 202 as ELSE alternatives. If the boost signal flag$_{boost}$ is set, N*$_{boost}$ is output as the upper limit $N^*_{up}$ 203 and as the lower limit $N^*_{low}$ 204. If there is no boost signal, the value $N_{max}$ is set as the upper limit $N^*_{up}$ and $N_{min}$ is set as the lower limit $N^*_{low}$ for the limiter.

The upper and lower limits determined by the IF-THEN branches are applied to a uniform control block 400. The uniform control block 400 also possesses the boost signal as well as the actual value of the rotational speed $n_{meas}$ and the actual value of the fed-in electrical power $P_{meas}$ as further input signals. This is in addition to the value of the power $P_{aero}$ currently available from the wind flowing over the rotor of the wind turbine. In the uniform control block 400, the upper and lower limits $N_{low}$ and $N_{up}$ for the limiter 102 are calculated from the applied set point values for the upper limit $N^*_{up}$ and the lower $N^*_{low}$. The uniform control block 400 is configured to control the torque of the wind turbine depending on the applied input variables in each operating state that can occur when carrying out a virtual inertia function.

Figure 5:
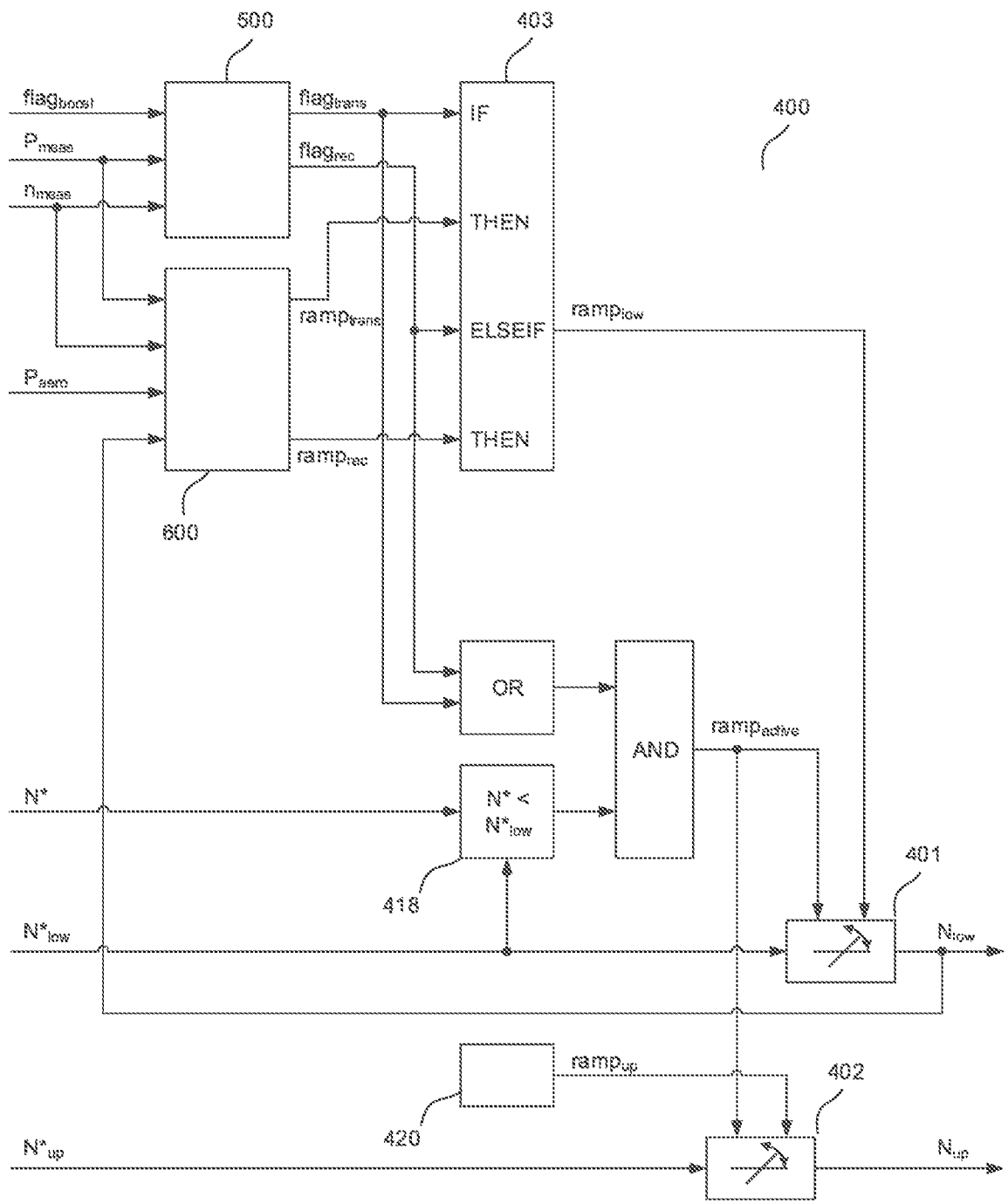
FIG. 5 illustrates a schematic diagram for determining the upper and lower limit during transition operation or recovery operation.

The manner of operation of the uniform control block 400 is described in more detail with reference to FIG. 5. The conversion of the set point values $N^*_{low}$ and $N^*_{up}$ into control variables $N_{low}$ and $N_{up}$ takes place via ramp functions 401, 402. The ramp functions are activated via a ramp signal $ramp_{active}$. The activation of the ramp function takes place when either the transition signal $flag_{trans}$ or the recovery signal $flag_{rec}$ is set by the switching block 500. In addition, the set point value $N^*$ for the generator torque that is obtained from the torque control must be smaller at the comparator 418 than the set point value for the lower torque limit $N^*_{low}$. Not represented in FIG. 5 is the further alternative of providing a second comparator that additionally checks whether the set point value for the generator torque $N^*$ is potentially also greater than the set point value for the upper limit $N^*_{up}$. In any case, it is a necessary requirement for the activation of the ramp functions 401 and 402 that the set point value $N^*$ for the generator torque is outside of the range defined by the set point values for the generator torque $N^*_{low}$ and $N^*_{up}$.

If the ramp functions are activated, the ramp $ramp_{low}$ is applied to the ramp function 401 for the lower limit at the limiter and the ramp $ramp_{up}$ is applied to the ramp function 402 for the upper limit at the limiter. The ramps are maximum permissible temporal changes for the generator torque. For the ramp function 402, constant values for the ramp $ramp_{up}$ are preset in a memory block 420.

Figure 7D:
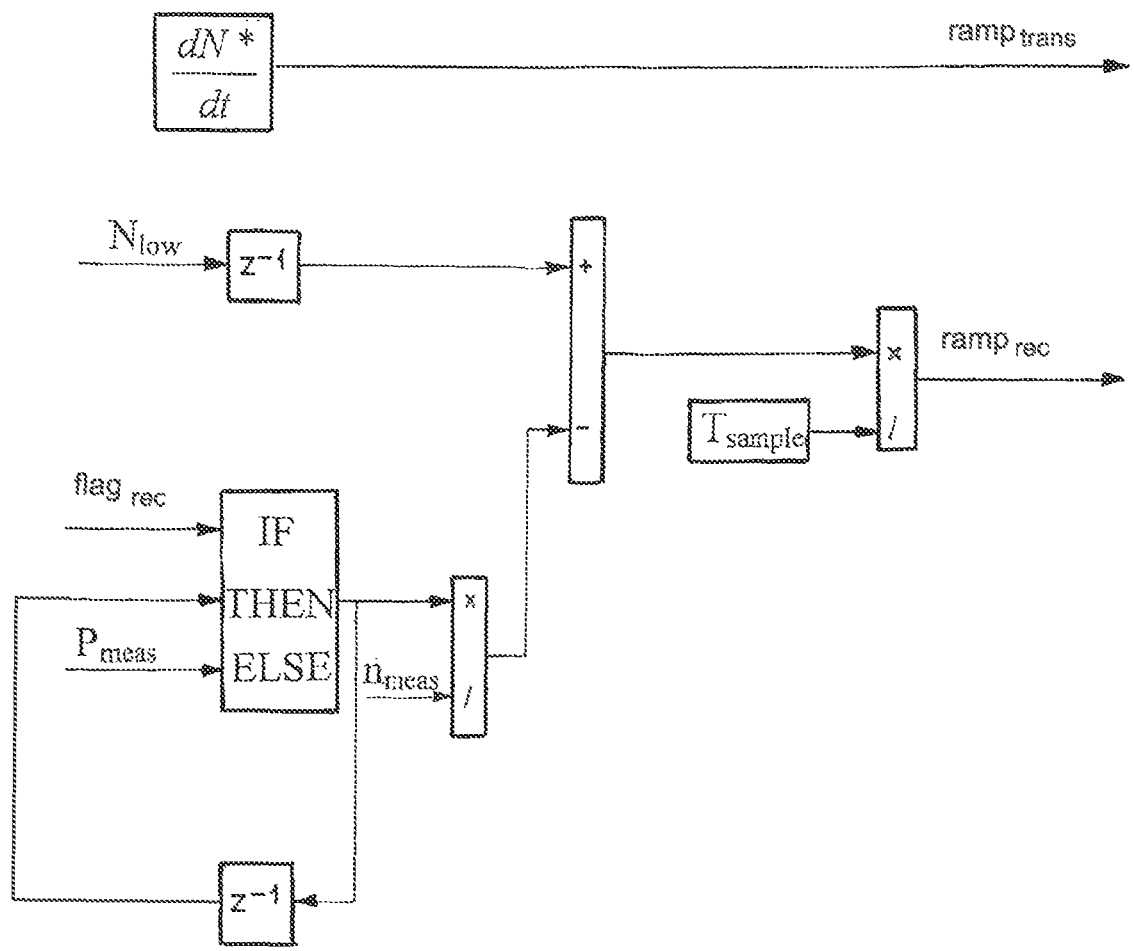
FIG. 7d illustrates a fourth embodiment of a method for operating the wind turbine in transition and/or recovery operation.

The calculation of the ramp functions takes place in block 600. FIG. 7 shows four exemplary embodiments for the calculations of the ramps in block 600. During the calculation of the ramp functions, it must be distinguished whether transition operation for the wind turbine is provided after the termination of boost operation or whether the control switches directly to recovery operation. FIGS. 7a and 7b relate to an operating mode in which the wind turbine switches directly to recovery mode, while FIGS. 7c and 7d characterize an interposed transition zone. The control signals $ramp_{rec}$ and $ramp_{trans}$ correspond to set variables for the generator torque.

FIG. 7a shows the determination of a select signal $ramp_{rec}$ for the ramp function. The select signal $ramp_{rec}$ is obtained, for example, from a look-up table in which the temporal change of the generator torque is provided as a function of the change of the rotational speed. The change of the rotational speed is determined from the actual value of the rotational speed $n_{meas}$ via a differentiating element 606. In the look-up table 604, the ratio of the power $P_{aero}$ that can be captured from the wind and the electrical power $P_{meas}$ that is fed in is determined. In the look-up table, it must be considered that the rotational energy in the wind turbine increases as the rotational speed rises, while the electrical power $P_{el}$ that is fed in also decreases as the generator torque N decreases. The maximum permissible change of the generator torque is limited via the control signal $ramp_{rec}$. When applied to the ramp functions, $ramp_{rec}$ can be applied both as $ramp_{low}$ to the ramp function 401 and as $ramp^{up}$ to the ramp function 402.

FIG. 7b shows an alternative embodiment in which a constant change term $$\frac{dn^*}{dt}\bigg|_{const}$$

is added to the temporal derivative of the actual value of the rotational speed. The change in rotational speed that is excessively increased in this way is corrected via a control 610. The control 610 has a proportional element and can be designed as a P, PI, or PID control. The output variable of the control 610 is the control signal $ramp_{rec}$ for the actuation of the ramp function 401 and 402.

FIG. 7c shows an example for calculating the control signals $ramp_{trans}$ and $ramp_{rec}$ for the ramp functions when there is a differentiation between transition operation and recovery operation after boost operation. During transition operation, a constant value $$\frac{dN^*}{dt}\bigg|_{const}$$

is set for the maximum permissible change of the generator torque and used as the control signal $ramp_{trans}$. This setting is temporally constant for the transition zone. If a switch to recovery operation occurs after transition operation, a quotient variable is subtracted, on the basis of the lower limit $N_{low}$ that was present before and that is set back by one time increment by means of a time element $z^{-1}$, by a differentiating element. The quotient variable is composed of the quotient that is formed by the difference between the power $P_{aero}$ that is available from the wind and a preset power difference $\Delta P$. The denominator of the quotient is formed by the actual value of the rotational speed. The power divided by the rotational speed corresponds to a torque, wherein the quotient can be interpreted as a torque that should be set in order to adjust a constant power differential $\Delta P$ below the available power $P_{aero}$. The present generator torque is reduced by this variable. The difference is divided by a preset time span $T_{sample}$ by means of a division element in order to obtain in this manner a maximum permissible change in torque as the control signal $ramp_{rec}$ for the ramp function. The central idea in recovery operation is that the power differential $\Delta P$ is no longer captured from the wind in order to increase in this manner the rotational energy of the wind turbine.

Another embodiment is explained in FIG. 7d. Here, too, the control signal 602 is set for the ramp function during transition operation to a constant value $$\frac{dN^*}{dt}\bigg|_{const}.$$

In recovery operation, the control signal $ramp_{rec}$ is calculated with a similar approach as in FIG. 7c. However, the torque to be subtracted that is applied to the differentiating element is not determined based on a preset power difference, but is determined on the basis of the actual power value $P_{meas}$ and the actual value for the rotational speed. As long as the recovery signal $flag_{rec}$ is an applied to IF-THEN, branch, the actual power value is held constant via a time element $z^{-1}$, i.e., it is held at the value before the switch to recovery operation occurs. For the rotational speed $n_{meas}$, the current actual value is chosen that is applied to a division element together with the power value. The central idea in this embodiment is that, by holding the power value, a proportional correction of the generator torque takes place corresponding to the actual value of the power when recovery operation begins.

Figure 6:
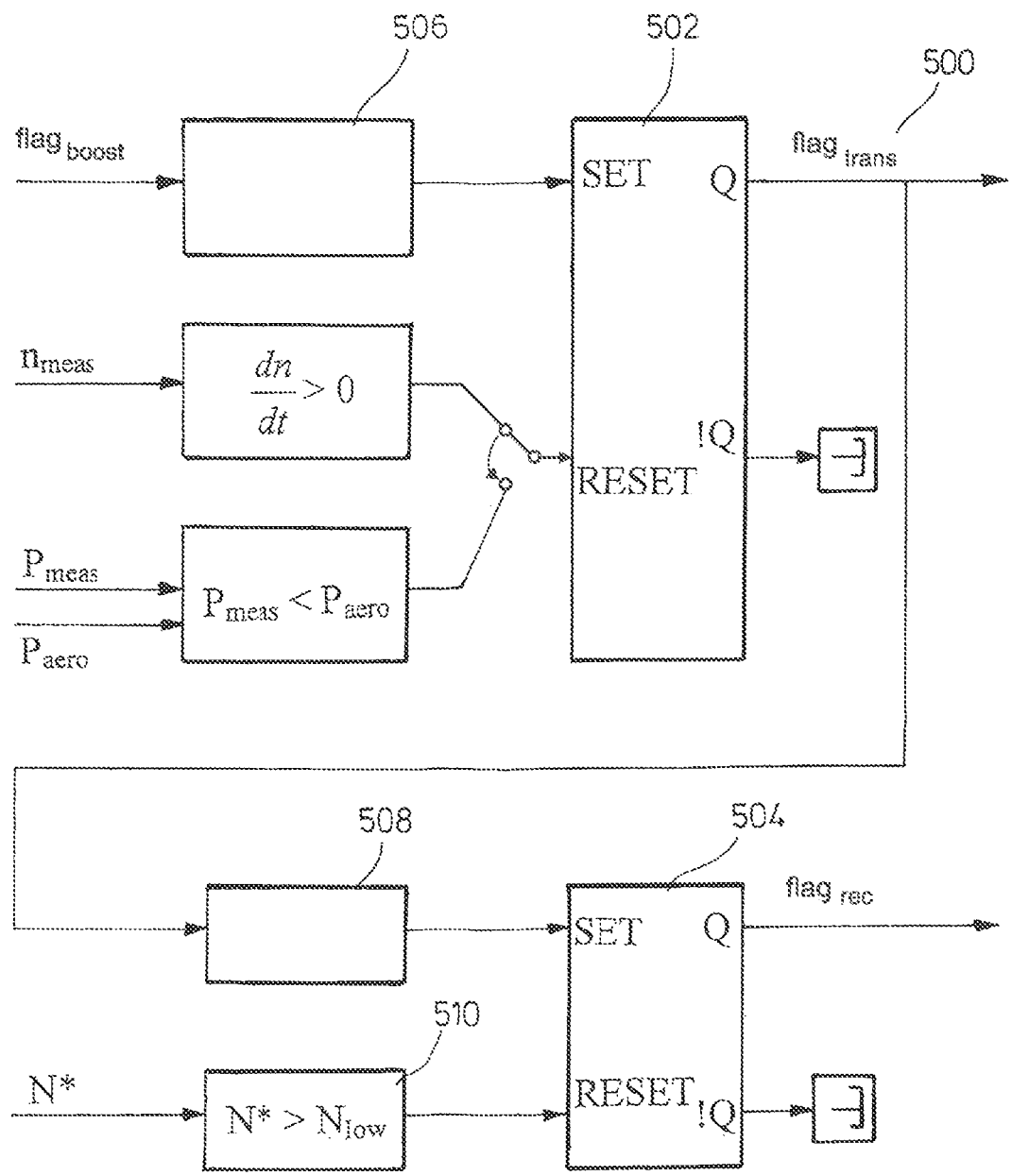
FIG. 6 illustrates a schematic diagram showing the process of switching from transition operation to recovery operation.

With reference to the uniform control block 400, this means that, when the transition signal $flag_{trans}$ is applied to the IF-THEN branch 403, the control signal $ramp_{low}$ for the ramp function 401 corresponds to the calculated control signal $ramp_{trans}$. If, however, the recovery signal $flag_{rec}$ is applied to the IF-THEN branch 403, the control signal $ramp_{low}$ for the ramp function 401 is set by the control signal 616 $ramp_{rec}$. Switching from the boost signal ($flag_{boost}$) to the transition signal ($flag_{trans}$) or the recovery signal ($flag_{rec}$) is represented in the switching block 500 in FIG. 5. A possible more detailed design for the switching block 500 can be found in FIG. 6.

Central elements for switching are two flip-flop circuits 502, 504. The boost signal $flag_{boost}$, which applies an input signal to the SET input of the flip-flop from the ON state to the OFF state via a recognition circuit 506 in the case of a reduction of the boost signal and thereby generates a transition signal $flag_{trans}$ at the Q output of the flip-flop circuit 502, is applied to the SET input of the flip-flop circuit 502. The end condition for the transition zone is triggered by setting the RESET input of the flip-flop 502. It can either be taken into account for a termination of the transition zone that the change in rotational speed is positive. This means the rotational speed increases again so that the transition signal $flag_{trans}$ can be reset. Alternatively to an increase in rotational speed, a signal can also be applied to the RESET input of the flip-flop circuit when the measured power $P_{meas}$ is smaller than the power $P_{aero}$ available at the time from the wind.

In both cases, the transition zone is terminated and the transition signal $flag_{trans}$ is reduced. In response to the reduction of the transition signal $flag_{trans}$, the detection unit 508 applies a signal to the SET input of the flip-flop circuit 504. Correspondingly, the recovery signal $flag_{rec}$ is set at the Q output. Recovery operation then continues until the output signal of the comparator 510 is applied to the RESET input of the flip-flop circuit 504, which indicates when the set point value for the generator torque N* is greater than the lower limit $N_{low}$ at the limiter. In addition, another comparator (not shown) can be provided that compares whether the set point value N* is smaller than the upper limit value $N_{up}$ at the limiter.

The functionality of transition operation and recovery operation can be summarized as follows. A signal for transition operation is set once it is detected that boost operation has been deactivated and the signal for virtual inertia operation is set. Transition operation can be deactivated when one of the two conditions from FIG. 6 that are applied to the RESET input of the flip-flop circuit 502 is fulfilled. When the rotational speed is greater than a predefinable small positive value and is large enough to trigger speed oscillations in the generator. The second condition relates to the actual value of the electrical power that is fed in, for example in the form of effective power, in relation to the estimated aerodynamic power $P_{aero}$ made available by the wind. A predefinable difference in the power is based on the losses between aerodynamic power and fed-in power and should be large enough to prevent a triggering of oscillations in the estimated aerodynamic power or in the effective power output.

If transition operation is terminated, recovery operation is initiated. Recovery operation is switched on as long as the torque set point value for normal operation is limited by the lower limit of the limiter (cf. comparator 510). Deactivation of recovery operation indicates that the wind turbine returns once again to its normal operation.

FIG. 8 shows the qualitative course of effective power P, generator torque N, rotational speed ω, and frequency f in the electrical transmission network over time. Boost operation is triggered at the point in time $t_1$, in which the grid frequency f falls below a value $f_{trigger}$. At the point in time $t_1$, boost operation is triggered. After a short rise in the effective power that is fed in and the generator torque N, the power that is fed in reaches a constant value that is higher by $P_{inc}$ than the power value $P_{pre}$ that was previously fed in before the frequency drop occurred. In boost operation, the generator torque N rises and the rotational speed w decreases.

After the predetermined period of time for the increased feeding in of power $T_{boost}$, the point in time $t_2$ is reached and the transition zone takes place. The transition zone is characterized in that the generator torque decreases with a constant gradient between the time span $t_2$ and $t_3$. In this time span, the rotational speed stabilizes. The transition zone is terminated when a lower power limit $P_{dip}$ is reached. In this manner, it is ensured that the power at the wind turbine does not fall too strongly and the wind turbine does not shut down. After the termination of transition operation, recovery operation begins at the point in time t3. In recovery operation, both the torque and the rotational speed increase until recovery operation is terminated. At the conclusion of recovery operation, the electrical power that is fed in corresponds to the electrical power fed in before the drop in frequency.

REFERENCE SIGN LIST

10 Wind turbine
11 Tower
12 Nacelle
14 Rotor
16 Rotor blades
18 Asynchronous generator
20 Converter
24 Transformer
25 Electrical transmission network
26 Control
27 Wind farm control
28 PI element
102 Limiter
200 Limiter control
201 IF-THEN branch
202 IF-THEN branch
300 Block
301 Additional block
302 Comparator
304 Recognition circuit
306 Flip-flop
308 Comparator
310 Recognition circuit
312 OR circuit
314 Time element
316 Comparator
318 IF-THEN branch
320 Time element
322 Selection element 324 Selection element
326 Calculation element
400 Uniform control block
401 Ramp function
402 Ramp function
403 IF-THEN branch
418 Comparator
420 Memory block
500 Switching block
502 Flip-flop circuit
504 Flip-flop circuit
506 Recognition circuit
508 Recognition circuit
510 Comparator
600 Control block
604 Look-up table
606 Differentiating element
610 Control
n* Rotational speed set point value
$n_{meas}$ Rotational speed actual value
N* Torque set point value
N*' Limited torque set point value
$N^*_{boost}$ Set point value for the generator torque
$N_{low}$ Applied lower limit
$N_{up}$ Applied upper limit
$N^*_{low}$ Set point value for the lower limit
$N^*_{up}$ Set point value for the upper limit
$N_{min}$ Minimum torque
$N_{max}$ Maximum torque
$f_{meas}$ Measured grid frequency
$f_{trigger}$ Triggering frequency
$f_{reset}$ Reset frequency
$T_{boost}$ Boost period
$P_{aero}$ Available power
$P_{boost}(f)$ Power value determined depending on the frequency
$P_{freeze}$ Frozen electrical power
$P_{inc}$ Power to be additionally provided
$P_{el}$ Electrical power fed in before the frequency dip occurs
$P_{meas}$ Measured electrical power
$P_n$ Rated power
$P_{total}$ Aggregated power set point value
$N^*_{boost}$ Set point value for generator torque in boost operation
$N_{max}$ Maximum torque in normal operation
$N_{min}$ Minimum torque in normal operation
$flag_{boost}$ Boost signal
$flag_{trans}$ Transition signal
$flag_{rec}$ Recovery signal
$ramp_{low}$ Ramp for the lower limit
$ramp_{up}$ Ramp for the upper limit
$ramp_{rec}$ Control signal for ramp function in recovery operation
$ramp_{trans}$ Control signal for ramp function in transition operation
$ramp_{active}$ Ramp signal $$\frac{dn^*}{dt}\bigg|_{const}$$

Constant temporal change of the rotational speed $$\frac{dN^*}{dt}\bigg|_{const}$$

Constant value for temporal change in torque
ΔP Constant power difference
$P_{dip}$ Lower power limit

The invention claimed is:

1. A method for controlling a wind turbine having a generator that is controlled via a converter where electrical power that is fed into an electrical transmission network is increased by a generative deceleration of the generator, the method comprising:

inputting an actual value of rotational speed ($n_{meas}$) and a rotational speed setpoint (n*) into a control;

outputting a set point value (N*) for a generator torque from the control;

inputting the set point value (N*) for the generator torque into a limiter with a predefinable upper and lower limit ($N_{up}$, $N_{low}$); and outputting a limited torque value (N*'), wherein the limited torque value (N*') is applied to a control of a converter;

increasing the actual value of the electrical power fed into an electrical transmission network ($P_{freeze}$) by an additional amount of power $P_{inc}$ in response to a boost signal ($flag_{boost}$), wherein electrical power fed into an electrical transmission network ($P_{freeze}$) and the additional amount of power $P_{inc}$ are combined into an aggregated power setpoint value ($P_{Total}$);

determining the set point value for a generator torque ($N^*_{boost}$) from the aggregated power setpoint value ($P_{Total}$); and applying the set point value for the generator torque ($N^*_{boost}$) in a boost operation to the limiter both as the upper limit and as the lower limit, wherein the boost signal ($flag_{boost}$) is generated when a frequency in the electrical transmission network falls below a first predetermined frequency value ($f_{trigger}$), and wherein the boost signal ($flag_{boost}$) is reset when at least one of a predetermined period of time ($T_{boost}$) has elapsed since the boost signal ($flag_{boost}$) has occurred and the actual value of the frequency ($f_{meas}$) in the electrical transmission network is greater than a second predetermined frequency value ($f_{reset}$), and wherein the second predetermined frequency value (freset) is greater than the first predetermined frequency value ($f_{trigger}$).

2. The method according to claim 1, wherein the boost signal ($flag_{boost}$) is generated when a temporal change of a frequency in the electrical transmission network exceeds a first predetermined gradient value.

3. The method according to claim 2, further comprising a plurality of different gradient values that each relate a change in frequency in the electrical transmission network to a predetermined period of time.

4. The method according to claim 1, wherein the set point value for the generator torque (N*) is calculated from the actual value of the electrical power fed into an electrical transmission network($P_{freeze}$) when the boost signal ($flag_{boost}$) occurs and an actual value of the rotational speed ($n_{meas}$).

5. The method according to claim 1, wherein on of a transition signal trans ($flag_{trans}$) and a recovery signal ($flag_{rec}$) is generated when the boost signal ($flag_{boost}$) is reset.

6. The method according to claim 5, further comprising:
setting the upper and the lower limit ($N_{up}$, $N_{low}$) at the limiter to predetermined values from a normal operation of the wind turbine in response to one of the transition signal ($flag_{trans}$) and the recovery signal ($flag_{rec}$); and controlling a temporal change of the set point value for the generator torque ($dN*/dt$) via a ramp function.

7. The method according to claim 6, wherein when the boost signal ($flag_{boost}$) is reset, the recovery signal ($flag_{rec}$) is generated and a maximum permissible constant value for temporal change of the set point value for the generator torque ($dN*/dt$) is determined depending on a constant temporal change of the rotational speed ($dn*/dt$).

8. The method according to claim 6, wherein when the boost signal ($flag_{boost}$) is reset, the recovery signal ($flag_{rec}$) is generated and a maximum permissible constant value for temporal change of the set point value for the generator torque ($dN*/dt$) is determined depending on the constant temporal change of the rotational speed via a control with at least one of a P element and a PI element, wherein a constant term ($dn*/dt$) is added to the temporal change of an actual value ($dn_{meas}/dt$) of the rotational speed.

9. The method according to claim 6, wherein when the boost signal ($flag_{boost}$) is reset, the transition signal ($flag_{trans}$) is generated and a maximum permissible constant value for temporal change of the set point value for the generator torque ($dN*/dt$) is set to a constant value.

10. The method according to claim 9, wherein the transition signal ($flag_{trans}$) is reset and the recovery signal ($flag_{rec}$) is set when the actual value of the rotational speed ($n_{meas}$) increases and a measured electrical power ($P_{meas}$) is smaller than an available power ($P_{aero}$).

11. The method according to claim 10, wherein the maximum constant value for temporal change of the set point value of the generator torque ($dN*/dt$) is determined depending on the actual value of the rotational speed ($n_{meas}$) and the available power ($P_{aero}$) when the recovery signal ($flag_{rec}$) is set.

12. The method according to claim 10, wherein the maximum constant value for temporal change of the set point value of the generator torque ($dN*/dt$) is determined using an actual value of the power ($P_{meas}$) that is fed in when the recovery signal occurs and on the actual value of the rotational speed ($n_{meas}$) when the recovery signal ($flag_{rec}$) is set.

13. The method according to claim 10, wherein the recovery signal ($flag_{rec}$) is reset when the set point value of the generator torque ($N*$) is within a range specified by the upper limit ($N_{up}$) and the lower limit ($N_{low}$) of the limiter.

14. A method for controlling a wind turbine having a generator that is controlled via a converter where electrical power that is fed into an electrical transmission network is increased by a generative deceleration of the generator, the method comprising:
   inputting an actual value of rotational speed ($n_{meas}$) and a rotational speed setpoint ($n*$) into a control;
   outputting a set point value ($N*$) for a generator torque from the control;
   inputting the set point value ($N*$) for the generator torque into a limiter with a predefinable upper and lower limit ($N_{up}$, $N_{low}$); and
   outputting a limited torque value ($N*'$), wherein the limited torque value ($N*'$) is applied to a control of a converter;
   increasing the actual value of the electrical power fed into an electrical transmission network ($P_{freeze}$) by an additional amount of power $P_{inc}$ in response to a boost signal ($flag_{boost}$), wherein electrical power fed into an electrical transmission network ($P_{freeze}$) and the additional amount of power $P_{inc}$ are combined into an aggregated power setpoint value ($P_{Total}$);
   determining the set point value for a generator torque ($N*_{boost}$) from the aggregated power setpoint value ($P_{Total}$); and
   applying the set point value for the generator torque ($N*_{boost}$) in a boost operation to the limiter both as the upper limit and as the lower limit,
   wherein the set point value for the generator torque ($N*$) is calculated from the actual value of the electrical power fed into an electrical transmission network ($P_{freeze}$) when the boost signal ($flag_{boost}$) occurs and an actual value of the rotational speed ($n_{meas}$), and
   wherein a value for boost power is a predetermined fraction of one of a rated power ($P_N$) and the actual value of the electrical power fed into an electrical transmission network ($P_{freeze}$) when the boost signal occurs.

15. The method of claim 14, wherein the boost signal ($flag_{boost}$) is generated when a frequency in the electrical transmission network falls below a first predetermined frequency value ($f_{trigger}$).

16. The method according to claim 14, wherein the value for the boost power is determined using an actual value of a frequency ($f_{meas}$) in the electrical transmission network.

17. A method for controlling a wind turbine having a generator that is controlled via a converter where electrical power that is fed into an electrical transmission network is increased by a generative deceleration of the generator, the method comprising:
   inputting an actual value of rotational speed ($n_{meas}$) and a rotational speed setpoint ($n*$) into a control;
   outputting a set point value ($N*$) for a generator torque from the control;
   inputting the set point value ($N*$) for the generator torque into a limiter with a predefinable upper and lower limit ($N_{up}$, $N_{low}$); and
   outputting a limited torque value ($N*'$), wherein the limited torque value ($N*'$) is applied to a control of a converter;
   increasing the actual value of the electrical power fed into an electrical transmission network ($P_{freeze}$) by an additional amount of power $P_{inc}$ in response to a boost signal ($flag_{boost}$), wherein electrical power fed into an electrical transmission network ($P_{freeze}$) and the additional amount of power $P_{inc}$ are combined into an aggregated power setpoint value ($P_{Total}$);
   determining the set point value for a generator torque ($N*_{boost}$) from the aggregated power setpoint value ($P_{total}$); and
   applying the set point value for the generator torque ($N*_{boost}$) in a boost operation to the limiter both as the upper limit and as the lower limit,
   wherein the set point value for the generator torque ($N*$) is calculated from the actual value of the electrical power fed into an electrical transmission network ($P_{freeze}$) when the boost signal ($flag_{boost}$) occurs and an actual value of the rotational speed ($n_{meas}$), and
   wherein the value for the boost power is determined using a measured change in frequency per time in the electrical transmission network.

* * * * *